United States Patent

[11] 3,632,975

[72] Inventors: Masao Ando, Yokohamashi;
Hideaki Takagi, Tokyo, both of Japan
[21] Appl. No.: 24,125
[22] Filed: Mar. 31, 1970
[45] Patented: Jan. 4, 1972
[73] Assignee: Chisso Corporation, Osaka, Japan
[32] Priority: April 22, 1969
[31] Japan
[31] 44/31093

[54] LONG HEAT-GENERATING PIPE UTILIZING SKIN EFFECT OF AC HAVING ONE OR MORE IMPEDANCE ELEMENTS IN THE CIRCUIT
2 Claims, 1 Drawing Fig.

[52] U.S. Cl. .................................................. 219/300
[51] Int. Cl. .................................................. H05b 3/40

[50] Field of Search .................................................. 219/300, 301

[56] References Cited
UNITED STATES PATENTS
3,293,407  12/1966  Ando .................................................. 219/301

Primary Examiner—R. F. Staubly
Attorney—Fred C. Philpitt

ABSTRACT: Impedance elements are inserted, to offset the nonuniformity of the electric current, i.e., heat generation, varying from position to position due to the distributed electrostatic capacity and inductance or to locally control heat generation, in the long heat-generating pipe which comprises a ferromagnetic pipe and an insulated conductor line installed therein and so arranged that an alternating current flows through the conductor line and the inner skin portion of the ferromagnetic pipe thereby to generate heat.

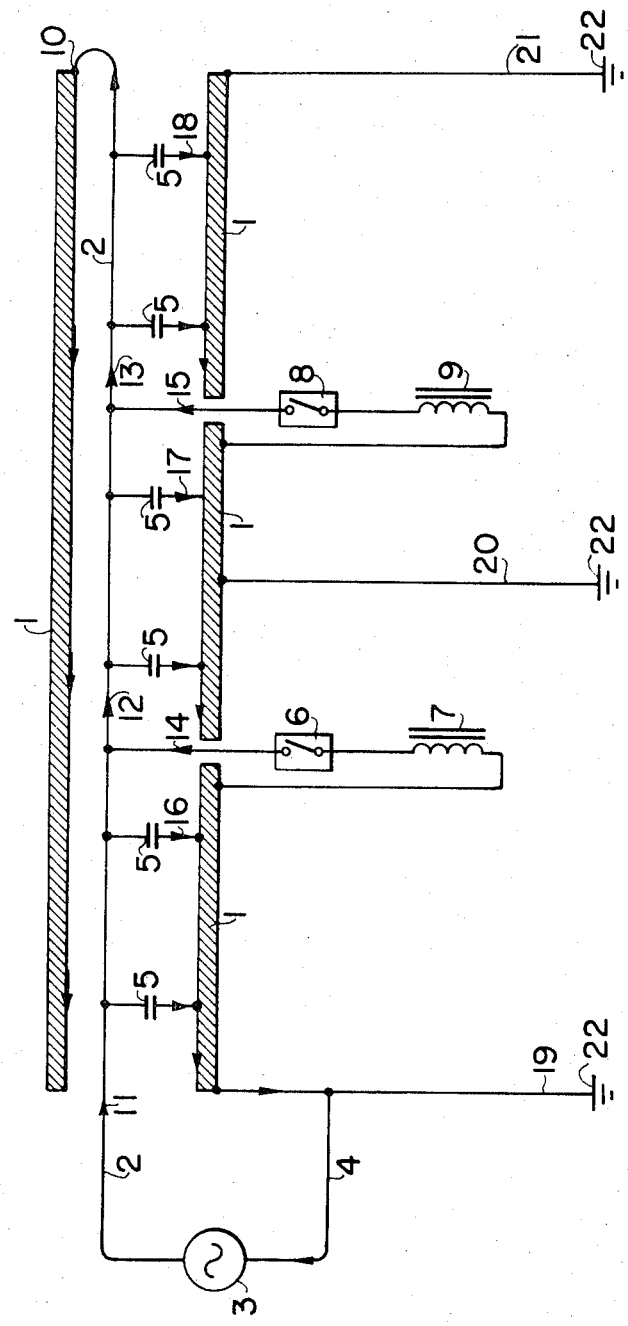

LONG HEAT-GENERATING PIPE UTILIZING SKIN EFFECT OF AC HAVING ONE OR MORE IMPEDANCE ELEMENTS IN THE CIRCUIT

BACKGROUND OF THE INVENTION

This invention relates to an improvement of a long heat-generating pipe utilizing skin effect of AC. More particularly this invention relates to a long heat-generating pipe utilizing skin effect of AC having one or more impedance elements in the circuit in order to offset nonuniformity of electric current, i.e., variation of heat generation in the direction of length or to control heat generation per unit length of the pipe.

The term "a heat-generating pipe utilizing skin effect of AC" as used herein is such a pipe as disclosed in the specification of U.S. Pat. No. 3,293,407.

This heat-generating pipe comprises a ferromagnetic pipe having a wall thickness of more than twice the depth of skin effect current of AC flowing through the ferromagnetic pipe, and an insulated conductor line installed therein, the one end of the conductor line being connected to the one end of the ferromagnetic pipe, and the other end of the conductor line and the ferromagnetic pipe being electrically connected to respective terminals of an AC source, wherein the AC flowing through the ferromagnetic pipe is concentrated in the inner skin portion thereof, generates heat and does not flow through the outer side of the ferromagnetic pipe. Even when the ferromagnetic pipe of such a heat-generating pipe is electrically connected to a liquid transportation pipe, e.g., by welding, the liquid transportation pipe can be heated without the flow of electric current through the liquid transportation pipe.

The depth of the above-mentioned skin S(cm.) is expressed by a formula:

$$S = 5030\sqrt{\frac{\rho}{\mu f}}$$

wherein $f$ is frequency of electric current (Hz.), $\mu$ is permeability of steel (0) and $\rho$ is resistivity ($\Omega$ cm.).

However, there is a distribution of electrostatic capacity between the ferromagnetic pipe and the conductor line placed therethrough. The charge current flowing through this distributed capacity will not be a big problem when the length of heat-generating pipe is short, but in case of a long-distance pipe over 10 km. it becomes a considerably large value even when the frequency is a commercial one. Because of this, the current flowing through the conductor line and accordingly the current flowing through the ferromagnetic pipe varies along the pipe in the direction of length. On the other hand, there also exists a distributed inductance within the conductor line and the skin portion of the ferromagnetic pipe. From the balancing relation between the distributed capacity and the distributed inductance, the amount of this electric current ordinarily decreases closer to a power source. By the above-mentioned variation of the current, the heat generation along the conductor line and along the ferromagnetic pipe corresponding to the position of the conductor line varies nearly proportionally to the second power of the current.

It is an object of the present invention to provide a long heat-generating pipe in which nonuniformity of heat generation along the length is offset. It is another object of the present invention to provide a long heat-generating pipe in which heat generation can be varied and controlled locally.

Such an object can be attained by the heat-generating pipe of the present invention having one or more impedance elements between the ferromagnetic pipe and the insulated conductor line placed therethrough.

The long heat-generating pipe of the present invention will be more fully understood by referring to the accompanying drawing which shows schematically a cross section in the direction of length of a long heat-generating pipe of the present invention.

In the drawing, 1 is a ferromagnetic pipe, e.g., a steel pipe having a sufficient thickness, 2 is a conductor line installed therethrough, 3 is an AC source, 4 is a conductor line connecting together the ferromagnetic pipe 1 and the AC source 3, and 10 is a junction between the ferromagnetic pipe 1 and the conductor line 2. Even when ground connections 19, 20 and 21 are provided to ground 22 in a heat-generating pipe having the above-mentioned structure, any earth currents practically do not flow. 5 is distributed electrostatic capacity produced between the ferromagnetic pipe 1 and the conductor line 2.

In order to offset the nonuniformity of electric current varying from position to position, impedance elements 7 and 9, the capacities of which are arranged so as to balance with the distributed capacities 5, are provided at some intervals; for example, every several tens of kilometers apart at a commercial frequency.

Thus compensating currents 14, 15 flow through these impedance elements and compensate the charging currents 16, 17, 18 flowing through the distributed capacities 5. Therefore, the current 11, 12 and 13 flowing through the conductor line 2 and the currents flowing through the skin portion of the inside of the steel pipe corresponding to the positions of the conductor line and hence the heat-generation become uniform. In this case, iron-core reactors which produce as little loss as possible are suitable as the impedance elements 7 and 9.

There are often cases where a long-distance pipe line which needs heating or temperature maintenance passes through the underground or over the surface of the ground. In such a case, the electric powers necessary for heating are generally different between the part under the ground and the part over the ground.

Under such a situation, one way for the control of electric power is to provide individual electric sources separately for each part, but it is often desirable to supply electricity from one electric source to both the parts by the use of only one long heat-generating pipe. For example, in the drawing, in case the heat generation of the section between the impedance elements 7 and 9 is intended to be controlled, while the heat generations in other parts are not intended to be controlled, it is possible to attain the object by selecting a proper combination of impedance elements 7 and 9. In this case, either impedance element 7 or 9 is a condenser and the other is a reactor. It is convenient, during the time of operation and at the time of repair, to install switches 6 and 8 for the impedance elements 7 and 9. From the foregoing explanation, it is understood that the heat-generating pipe of the present invention is economical, when the heat generation in the circuit of a long-distance heat-generating pipe is to be made uniform and varied or controlled locally along the length of the pipe, because there is no need to provide individual electric sources which are required in conventional apparatus, and therefore the cost of expensive electric source apparatus and accompanying feedlines can be saved.

In the above description, the heat-generating pipe of the present invention is applied to a single-phase circuit, but, as a matter of course, it can be applied to a general multiphase circuit, such as a three-phase circuit by multiple use.

We claim:

1. A long heat-generating pipe comprising a ferromagnetic pipe, an insulated conductor line installed therein and one or more impedance elements inserted between the conductor line and the ferromagnetic pipe, the one end of the said conductor line being connected to the one end of the ferromagnetic pipe and the other ends of the conductor line and the ferromagnetic pipe being electrically connected to respective terminals of an AC source to form and AC circuit, wherein the AC flowing through the ferromagnetic pipe is concentrated in the inner skin portion thereof and heat generation is locally controlled by the said one or more impedance elements inserted locally therealong between the conductor line and the ferromagnetic pipe.

2. A heat-generating apparatus comprising two or more heat-generating pipes according to claim 1 which are so combined as to form a multiphase circuit.